Nov. 4, 1952     H. BIENFAIT ET AL     2,617,003
METHOD OF AUTOMATIC ELECTRIC ARC WELDING OF WORKPIECES
Filed May 2, 1947
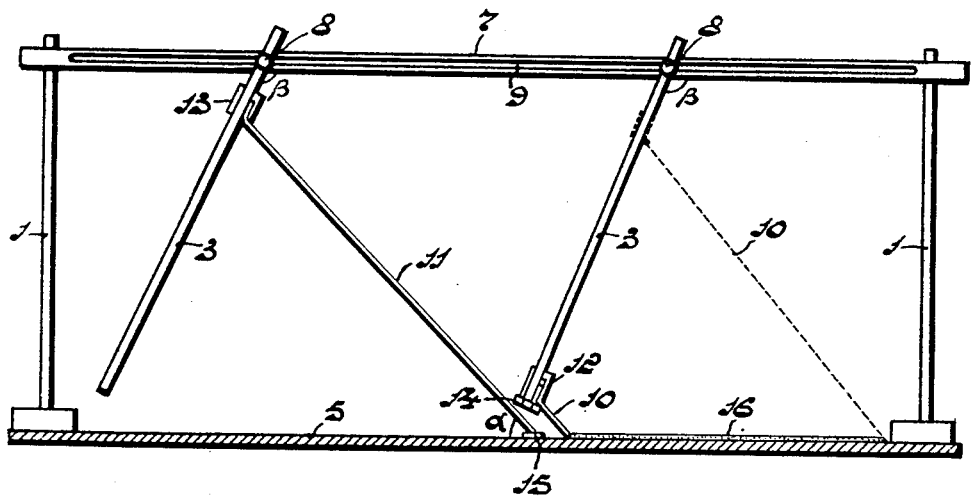
H. BIENFAIT & S. D. BOON
INVENTORS
BY 
ATTORNEY.

Patented Nov. 4, 1952

2,617,003

UNITED STATES PATENT OFFICE 2,617,003

METHOD OF AUTOMATIC ELECTRIC ARC WELDING OF WORKPIECES

Henri Bienfait and Simon Dirk Boon, Eindhoven, Netherlands, assignors to Hartford National Bank and Trust Company, Hartford, Conn., as trustee Application May 2, 1947, Serial No. 745,554
In the Netherlands May 14, 1946

4 Claims. (Cl. 219—10)

This invention relates to the automatic electric arc-welding of work-pieces by means of a plurality of coated welding rods.

The present invention differs from various automatic methods allowing the use of a plurality of coated welding rods in succession in that it utilizes rods of the touch-welding type, which affords a material simplification. In this case it is possible that the next welding rod already occupies its operating position when the welding process with the preceding rod is still in progress.

In one particular embodiment of the invention use is made of self-starting rods of the touch-welding type, which permits formation of the arc of the next welding rod in a simple manner, as will be explained more fully hereinafter. In this particular embodiment it is advantageous that a welding rod of which it is not yet the turn and which, bearing on the work-piece, already occupies the operating position should be insulated by an insulating layer, for example of paper, in order to prevent premature ignition of the welding rod.

Touch-welding rods which are, moreover, of the self-starting type may be obtained by the use of a coating containing a sufficient quantity of conductive material and more particularly of metal powder. As an example we may mention a coating of the composition 12% of calcium fluoride, 13% of calcium carbonate, 7% of ferroalloy, 61% of powdery iron and 7% of waterglass and aluminum silicate.

In order that the invention may be more clearly understood and readily carried into effect, it will now be described more fully by reference to the accompanying drawing.

The figure shows two stands 1 on which bears a transverse rod 7 which carries the two guide paths 3. The latter may be clamped in position at a desired angle β by beams of screws 8. In order to permit lateral displacement, the rod 7 exhibits a slot 9 so that the distance between the guide paths 3 is adjustable. The rods 10 and 11, which are of the touch-welding and self-starting type, are secured at a definite angle α in the guide pieces 12 and 13 which can move along the guide paths 3. When welding rod 10 is substantially consumed, it cannot move farther towards the work-piece 5 since the guide piece 12, together with the welding rod 10, comes to bear on an abutment 14 so that further displacement of the welding rod 10 towards the work-piece 5 does not take place. Consequently, the length of the arc of the welding rod 10 and hence also the arc voltage increases at last, which arc voltage attains a value sufficiently high to bring about formation of an arc at the extremity of welding rod 11. The temperature near the extremity of the welding rod 11 has in the meantime attained a value which is sufficiently high to allow the insulating paper 15 to be burnt.

The drawing otherwise shows that the distance between the guide paths, the angles at which the guide paths and the welding rods are positioned, and the length of the welding rods are so adjusted that formation of an arc at the extremity of welding rod 11 occurs when welding rod 10, which has formed a welding bead 16, is substantially consumed.

What we claim is:

1. A method of automatic electric arc-welding of work-pieces by means of a plurality of coated self-starting touch-welding rods comprising the steps of placing a first conductive coated touch-welding rod with one end thereof in welding position with relation to the work-piece and a second conductive coated touch-welding rod with one end thereof in welding position with relation to the said work-piece but with insulation therebetween, connecting a common welding current to both said welding rods and to said work-piece to so form a welding arc between said first rod and said welding piece, touch-welding said welding piece with said end of said first rod until a predetermined portion of said first rod is consumed thereby, then keeping the remaining portion of said first rod spaced from said work-piece to increase the length of said welding arc and thereby increase the arc voltage until the arc voltage attains a value sufficiently high to break down the insulation between said second rod and said work-piece and so start a welding arc between said second rod and said work-piece.

2. A method of automatic electric arc-welding of work-pieces by means of a plurality of coated self-starting touch-welding rods comprising the steps of placing a first conductive coated touch-welding rod with one end thereof in welding position with relation to the work-piece and a second conductive coated touch-welding rod with one end thereof in welding position with relation to the said work-piece but with insulation therebetween, connecting a common welding current to both said welding rods and to said work-piece to so form a welding arc between said first rod and said welding piece, touch-welding said welding piece with said end of said first rod until a predetermined portion of said first rod is consumed thereby, then keeping the remaining portion of said first rod spaced from said work-piece to increase the length of said welding arc and thereby increase the arc voltage until the arc voltage attains a value sufficiently high to break down the insulation between said second rod and said work-piece, and so start a welding arc between said second rod and said work-piece, and continuing the automatic touch-welding of said work-piece with said second rod.

3. A method of automatic electric arc-welding of work-pieces by means of a plurality of coated self-starting touch-welding rods comprising the steps of placing a first conductive coated touch-welding rod with one end thereof in welding position with relation to the work-piece and a second conductive coated touch-welding rod with one end thereof in welding position with relation to the said work-piece but with an insulating material therebetween, connecting a common welding current to both said welding rods and to said work-piece to so form a welding arc between said first rod and said welding piece, touch-welding said welding piece with said end of said first rod until a predetermined portion of said first rod is consumed thereby, then keeping the remaining portion of said first rod spaced from said work-piece to increase the length of said welding arc and thereby increase the arc voltage until the arc voltage attains a value sufficiently high to break down the insulating material between said second rod and said work-piece and so start a welding arc between said second rod and said work-piece, and continuing the touch-welding of said work-piece with said second rod.

4. A method of automatic electric arc-welding of work-pieces by means of a plurality of coated self-starting touch-welding rods comprising the steps of placing a first conductive coated touch-welding rod with one end thereof in welding position with relation to the work-piece and a second conductive coated touch-welding rod with one end thereof in welding position with relation to the said work-piece but with insulation therebetween, connecting a common welding current to both said welding rods and to said work-piece to so form a welding arc between said first rod and said welding piece, touch-welding said welding piece with said end of said first rod by causing movement of said first rod towards said second rod until a predetermined portion of said first rod is consumed thereby, then keeping the remaining portion of said first rod spaced from said work-piece to increase the length of said welding arc and thereby increase the arc voltage until the arc voltage attains a value sufficiently high to break down the insulation between said second rod and said work-piece and so start a welding arc between said second rod and said work-piece, and continuing the touch-welding of said work-piece with said second rod by causing movement of said second rod away from said first rod.

HENRI BIENFAIT.
SIMON DIRK BOON.

REFERENCES CITED

The following references are of record in the file of this patent:

UNITED STATES PATENTS

| Number | Name | Date |
| --- | --- | --- |
| 1,770,811 | Schwartz et al. | July 15, 1930 |
| 1,807,961 | Burnish | June 2, 1931 |
| 1,898,908 | Southgate | Feb. 21, 1933 |
| 2,204,545 | Faunce | June 18, 1940 |
| 2,402,165 | Kinkead | June 18, 1946 |
| 2,421,095 | Tyrner | May 27, 1947 |
| 2,429,175 | Willigen et al. | Oct. 14, 1947 |
| 2,453,950 | Van Den Berge et al. | Nov. 16, 1948 |
| 2,470,178 | Madsen | May 17, 1949 |
| 2,477,906 | Smith | Aug. 2, 1949 |
| 2,536,999 | Skytte | Jan. 2, 1951 |

FOREIGN PATENTS

| Number | Country | Date |
| --- | --- | --- |
| 358,608 | Great Britain | Oct. 15, 1931 |